United States Patent
Kedia et al.

(10) Patent No.: US 10,216,589 B2
(45) Date of Patent: Feb. 26, 2019

(54) SMART DATA REPLICATION RECOVERER

(71) Applicant: INTERNATIONAL BUSINESS MACHINES CORPORATION, Armonk, NY (US)

(72) Inventors: Pravin K. Kedia, Mumbai (IN); Nirmal Kumar, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 423 days.

(21) Appl. No.: 15/058,316

(22) Filed: Mar. 2, 2016

(65) Prior Publication Data

US 2017/0255528 A1 Sep. 7, 2017

(51) Int. Cl.
*G06F 17/30* (2006.01)
*G06F 11/14* (2006.01)

(52) U.S. Cl.
CPC ...... *G06F 11/1474* (2013.01); *G06F 11/1451* (2013.01); *G06F 11/1464* (2013.01); *G06F 11/1469* (2013.01); *G06F 11/1471* (2013.01); *G06F 17/30377* (2013.01); *G06F 17/30884* (2013.01); *G06F 2201/84* (2013.01)

(58) Field of Classification Search
None
See application file for complete search history.

(56) References Cited

U.S. PATENT DOCUMENTS

| 6,092,086 | A | * | 7/2000 | Martin | ............ G06F 17/30575 |
| 7,191,299 | B1 | | 3/2007 | Kekre et al. | |
| 9,003,374 | B2 | | 4/2015 | Ngo | |
| 9,047,357 | B2 | | 6/2015 | Ngo | |

OTHER PUBLICATIONS

IBM: List of IBM Patents or Patent Applications Treated as Related (Appendix P), May 8, 2017, 2 pages.
Pending U.S. Appl. No. 15/582,976, filed May 1, 2017, entitled: "Smart Data Replication Recoverer", 21 pages.

* cited by examiner

*Primary Examiner* — Anhtai V Tran
(74) *Attorney, Agent, or Firm* — Teddi E. Maranzano

(57) ABSTRACT

A processor-implemented method for selective data replication recovery in a heterogeneous environment is provided, including a source agent, a target agent, and data replication recoverer (DRR) agent. The method includes receiving, by a DRR agent, one or more committed transaction records from a source agent, which is configured to receive the one or more committed transaction records from a source database. The DRR agent creates data and metadata records from the received one or more committed transaction records, and saves the data and the metadata records in a data replication repository. In response to receiving a request to recover a target database, the DRR agent selectively recovers target database using either one or more individual transactions or a bookmark.

5 Claims, 3 Drawing Sheets

SMART DATA REPLICATION RECOVERER

BACKGROUND

This disclosure relates generally to the field of data replication, and more particularly to data replication recovery.

Data replication, also referred to as change data capture, provides trusted data synchronization between a source database and one or more target databases. The source database collects transactions as they are committed and saves them in a repository. Specialized agents send the committed transactions across a network to the target computer where they are received by other specialized agents and applied to the target database. In this way, the target database is a duplicate of the source database. Read-only applications may direct queries to the target database, thereby reducing contention and increasing performance on the source database. Additionally, if the source computer, source database, or network fails, the target database may act as source database.

At any point in time, the replicated target database data should be in sync with the source database. However when a failure, for example data corruption, on the source database interrupts replication to the target database, data replication cannot easily be restarted. Typically, the source database is restored using a known reliable archive. Additional archive media or transaction log files may be applied to bring the source database to a point in time prior to the issue that caused the failure. Since it is likely that the target database represents a later point in time later than the source database, particularly after the source database is recovered, to restore the replication environment, the same archive and log media that is applied to the source database is also applied to the target database. This tends to be a time consuming process, during which the databases are unavailable to the business enterprise.

Having the ability to selectively roll back or not apply transactions on the target database may eliminate the need for a complete restore of the target database, expedite the resynchronization of the replication environment, and reduce the time the replication environment is unavailable.

SUMMARY

According to one embodiment a processor-implemented method for selective data replication recovery in a heterogeneous environment is provided, including a source agent, a target agent, and data replication recoverer (DRR) agent. The method includes receiving, by a DRR agent, one or more committed transaction records from a source agent, which is configured to receive the one or more committed transaction records from a source database. The DRR agent creates data and metadata records from the received one or more committed transaction records, and saves the data and the metadata records in a data replication repository. In response to receiving a request to recover a target database, the DRR agent selectively recovers target database using either one or more individual transactions or a bookmark.

According to another embodiment, a computer program product for data replication recovery in a heterogeneous environment is provided. The computer program product includes a DRR agent embodied on a computer readable storage medium. The DRR agent includes program instructions executable by a processor, to receive one or more committed transaction records from a source agent, which is configured to receive the one or more committed transaction records from a source database. The DRR agent creates data and metadata records from the received one or more committed transaction records, and saves the data and the metadata records in a data replication repository. In response to receiving a request to recover a target database, the DRR agent selectively recovers the target database using either one or more individual transactions or a bookmark.

According to another embodiment, a computer system for data replication recovery in a heterogeneous environment is provided. The computer system includes one or more processors, one or more computer-readable storage devices, and a plurality of program instructions stored on at least one of the one or more storage devices for execution by at least one of the one or more processors. The plurality of program instructions include program instructions to receive, by a DRR agent, one or more committed transaction records from a source agent which is configured to receive the one or more committed transaction records from a source database. Program instructions are included for the DRR agent to create data and metadata records from the received one or more committed transaction records, to save the data and the metadata records in a data replication repository. In response to receiving a request to recover a target database, program instructions are included for the DRR agent to selectively recover the target database using either one or more individual transactions or a bookmark.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the present invention relate generally to the field of data replication, and more particularly to data replication recovery.

The following described exemplary embodiments provide a system, method and program product having the capacity to improve the technical field of database replication by reducing the time a data replication environment is unavailable to a business enterprise following a failure, and by simplifying the restore process by providing a user-friendly interface to select which transactions to apply or roll back on the target database.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
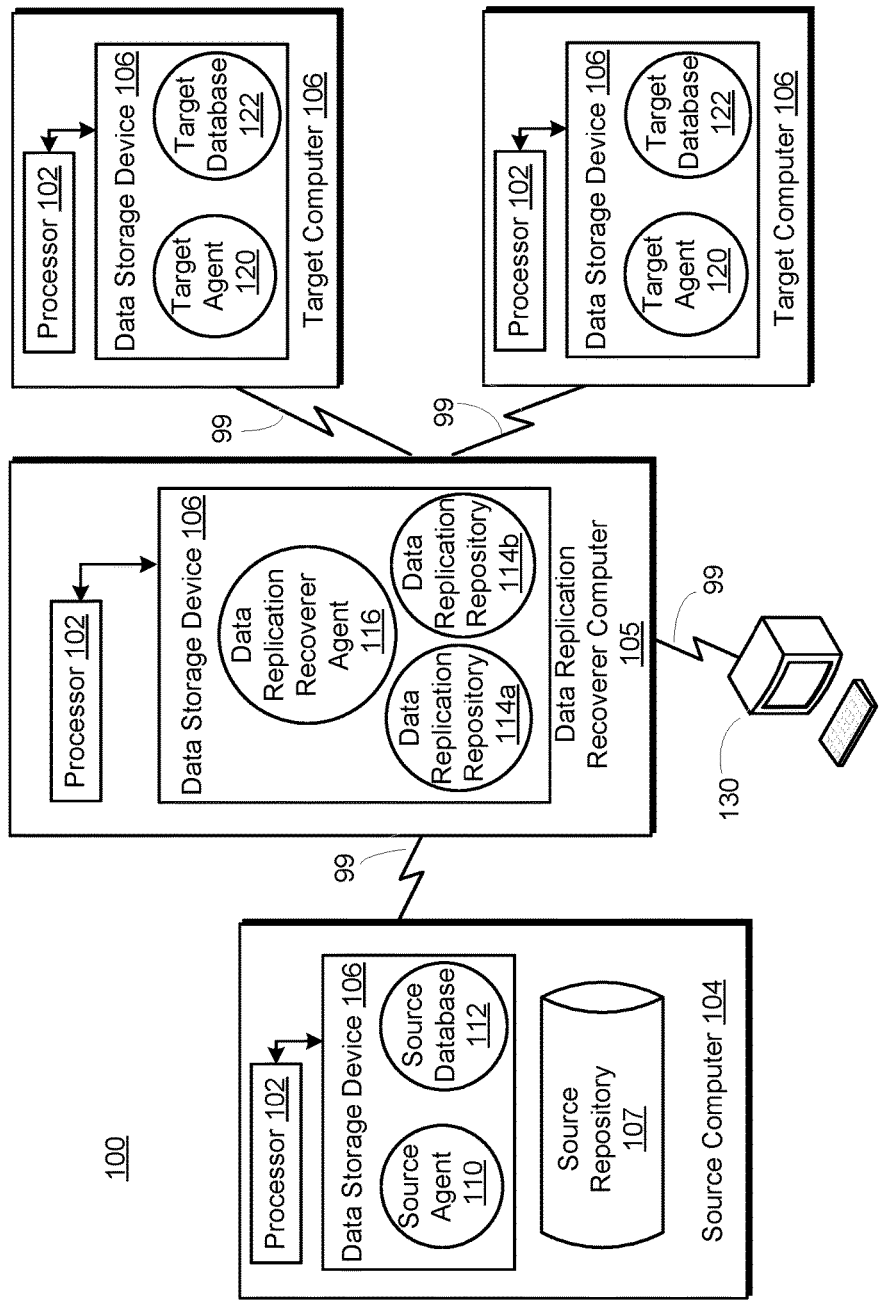
FIG. 1 illustrates an exemplary computer system environment operable for various embodiments of the disclosure.

FIG. 1 illustrates a block diagram of an exemplary change data capture (CDC) computer system 100 operable for heterogeneous data replication according to various embodiments of the disclosure. CDC is the process of capturing changes made at the data source and applying them to targets in the enterprise. In this illustrative example, the CDC computer system 100 may include a source computer 104, a data replication recoverer (DRR) computer 105, and one or more target computers 106 that receive committed transactions from the source computer 104. Each computer includes at least one processor 104 and at least one storage device 106. The CDC computer system 100 may additionally include an administrative client computer 130, also having at least one processor and at least one storage device. Each computer (and administrative client) in the networked computer 100 communicates over a network 99. The network 99 may include various types of communication networks, such as a wide area network (WAN), local area network (LAN), a telecommunication network, a wireless network, a public switched network and/or a satellite network. The source computer 104, the DRR computer 105, the target computers 106, and the administrative client computer 130, may each be implemented as separate physical computers, as virtual partitions on one or more physical computers, or on any combination thereof. The source computer 104, the DRR computer 105, the target computers 106, and the administrative client computer 130 may each be implemented as separate physical computers, as virtual partitions on one or more physical computers, or on any combination thereof.

The source computer 104 in the CDC computer system 100 includes a source database 112. Each of the target computers 106 also includes a target database 122 configured to receive change data records, representing committed transactions, from the source database 112 on the source computer 104. The target database 122 may include a relational DBMS, such as IBM® DB2® (IBM and DB2 are trademarks of International Business Machines Corporation in the United States, other countries, or both), or a non-relational DBMS, such as Apache™ Hadoop® (Apache Hadoop, Hadoop, and the yellow elephant logo are either registered trademarks or trademarks of the Apache Software Foundation in the United States and/or other countries). Several target databases 120 may subscribe to the source database 112, even when each subscribing target database 122 is an architecturally different database product (i.e., heterogeneous). The source database 112 writes to a source repository 107 the transactions that are committed on the source database 112 but are waiting for the subscriptions, i.e. target databases 122, to confirm the CDC target has applied them. The contents and format of the records in the source repository 107 may vary, depending upon the implementation and architecture of the source and target databases.

The CDC computer system 100 includes one or more source agents 110, one of which is shown. The source agent 110, the target agent 120 and the DRR agent 116 are added to an existing data replication configuration to enable restoring, selectively, transactions that are committed on the target database 122. As shown, the DRR agent 116 is installed on a separate DRR computer 105. However, the location of the DRR agent 116 is configurable. For example, the DRR agent 116 can be located on the source computer 104, a target computer 106, on the administrative client computer 130, or on still another computer. The configuration depicted in FIG. 1 assumes one data replication repository per target database, residing along with the DRR agent 116 on a DRR computer 105.

In one implementation, the DRR computer 105 may include one source agent 110 for each target agent 120. Alternatively, the DRR computer 105 may include one source agent 110 to service all target agents 120, even when the source database 112 and target databases 122 differ by architecture and/or vendor. In another implementation, one vendor may supply the set of source database 112, source agent 110, target agent 120 and target database 122 to ensure architectural compatibility among the CDC components.

The source database 112 writes to the source repository 107 the committed transaction records that are destined for one or more target database 122. The content and format of the committed transaction records may depend upon the vendor's implementation of the source database 112, but typically include the data that is changed in the transaction, rather than one or more entire table rows.

The source agent 110 uses the committed transaction records to build and maintain the data replication repository 114a, 114b. In an implementation, the source agent 110 extracts the committed transaction records from the database transaction logs that the source database 112 writes. In another implementation, the source agent 110 extracts the committed transaction records from the source repository 107.

The DRR agent 116 receives the committed transaction records from the source agent 110 and stores the change data in a data replication repository 114a, 114b. The location of the data replication repositories 114a and 114b is configurable in terms of size, format, organization, and location, among other factors. For example, they can be located on the source computer 104, a target computer 106, on a separate DRR computer 105 as shown in FIG. 1, on the administrative client computer 130, or on still another computer.

The DRR agent 116 creates metadata for each committed transaction. The transaction metadata includes: 1) the transaction data; 2) transaction identifier; 3) transaction timestamp; 4) transaction statistics; 5) the type and number of insert, update, and delete operations in the transaction; and 6) the objects and tables involved in the operations. Other transaction metadata may include information descriptive of the database logs from the source database 112, such as timestamps, log sequence number, positions within the log that identify the transactions. The DRR agent 116 may include one data replication repository for each target database 122. For example, FIG. 1 shows two data replication repositories, 114a and 114b, one for each target database 122. The DRR agent 116 can translate the committed transaction records from the source database 112 into the format required by the target database 122. The combination of transaction metadata and the data from the committed transaction records include the information to selectively roll back (i.e., restore) the target database 122 to resynchronize CDC with the source database 112. Thus, the DRR agent 116 performs data replication and data replication recovery between heterogeneous databases using the multiple separate data replication repositories.

The transaction metadata also includes both pre-configured bookmarks and manually configured custom bookmarks. Each bookmark records a stable save point, indicating that the CDC replication is stable up to that bookmarked event. For example, if a new application version implements a new type of transaction, or if maintenance is applied to some component in the CDC computer system 100, the administrator may manually configure a custom bookmark to indicate that CDC replication is stable up to that bookmarked event. If an event occurs after the recorded bookmark, the target database 122 can be recovered by removing those transactions that were committed after the bookmark. Each bookmark records a first log position corresponding to the commit point of the last committed transaction on the target database, a second log position corresponding to the earliest open transaction on the source database, and a third log position corresponding to the last applied transaction on the target database. In this context, an applied transaction is one where all the database operations, such as insert, update, and delete, have been performed on the database but the transaction is not finalized, i.e., committed.

If the source database 112 is recovered, for example following a failure, the administrator may recover the target database 122 by selecting a bookmark from the administrative client program, for example on the administrative client computer 130. The administrative client computer 130 includes an interface through which the administrator can choose which target database(s) 122 to recover and select which bookmark to use as the recovery point. Alternatively, the administrator may select to roll back one or more individual transactions on the target database 122. The interface may include a graphical user interface (GUI), a command line, and an application programming interface (API).

Rather than performing a complete recovery of the target using archive and backup media, the DRR agent 116 uses the data and metadata records in the data replication repository 114a, 114b to roll back transaction records on the selected target database 122 that are past the selected bookmark recovery point. Recovery starts with the last applied transaction and proceeding back in time until reaching the selected bookmark. The DRR agent 116 creates database operations to reverse the transactions to be rolled back. For example, an insert operation is created to undo a delete operation. The DDR agent 116 updates the data replication repository 114a, 114b to reflect the status of the transaction records (i.e., transaction is rolled back on the target or queued to roll back) and metadata as the recovery is performed on the target database 122. Thus, recovery may be completed, either to a bookmark or by rolling back selected transactions. As a result, resynchronizing the CDC environment can require less time than backup/archive/log recovery, thereby reducing the time that the CDC environment is unavailable.

As will be discussed with reference to FIG. 3, each computer in the CDC computer system 100 may include internal components 800 and external components 900, respectively, and administrative client computer 130 may include internal components 800 and external components 900, respectively.

Figure 2:
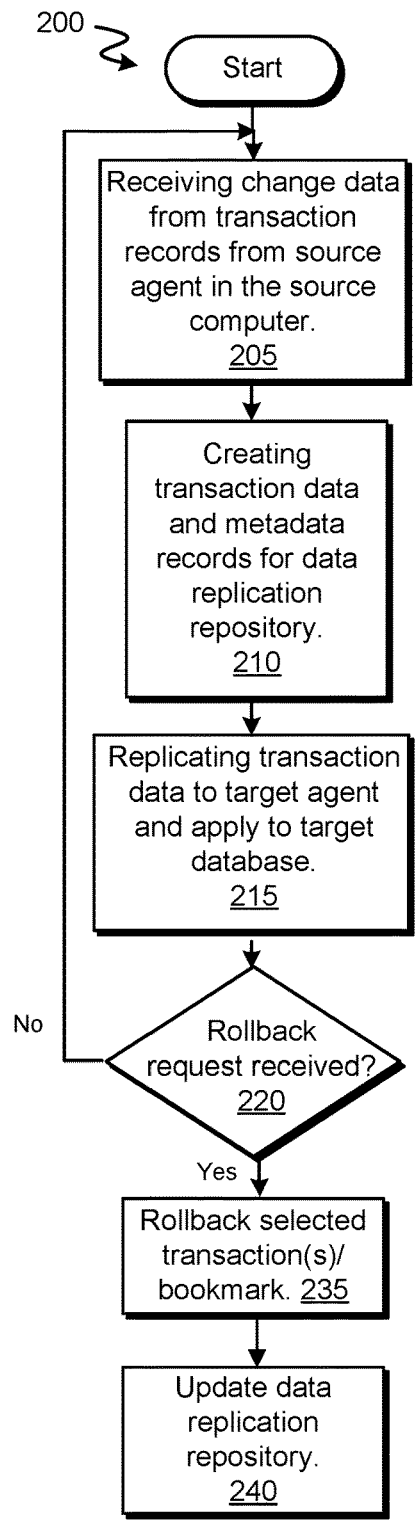
FIG. 2 illustrates components and algorithms associated with data replication recovery, according to various embodiments of the disclosure.

FIG. 2 illustrates components and algorithms associated with data replication recovery, according to various embodiments of the disclosure.

At 205, the DRR agent 116 receives committed transaction records from the source agent 110 on the source computer 104. The source agent 110 captures change data records from the committed transaction records in the database transaction logs. The content and format of the change data depends upon the implementation of the source database product. The source agent 110 only extracts committed transaction records since these transactions have successfully completed on the source database 112, whereas open transactions may either fail or be cancelled, thus requiring them to be rolled back.

At 210, the DRR agent 116 creates and inserts transaction data and metadata records into the data replication repository 114a, 114b. The source agent 110 coordinates with the DRR agent 116 to capture the change data from the database transaction logs and insert the transaction data into the data replication repository 114a, 114b that is associated with the respective target database 122. In the heterogeneous CDC computer system 100, there can be multiple target databases 122 for the source database 110. The DRR agent 116 can translate the committed transaction records from the source database 112 into the format required by the target database 122 prior to inserting the transaction data into the data replication repository 114a, 114b associated with the target database 122. Therefore, there may be one data replication repository for each target database 122. The one-for-one correspondence facilitates including heterogeneous relational/non-relational databases in the CDC computer system 100.

As part of the change data capture from the committed transaction records in the database transaction logs, the source agent 110 may aggregate transaction statistics, such as the number of operations performed on the source database 112 (e.g., insert/delete, update), and the number of source database 112 rows (or objects) processed in the transaction. The DRR agent 116 may create the metadata entry associated with the committed transaction using the aggregated statistics created by the source agent 110, and encapsulate the metadata entry with a bookmark.

At 215, after the transaction data and metadata are stored in the data replication repository 114a, 114b, the transaction data and metadata are continuously replicated to the target agent 120 to be applied to the tables in the target database 122.

At 220, if a rollback is not requested for one or more of the target databases 122, the DRR agent 116 returns to step 205 to receive additional transaction records from the source agent 110 on the source computer 104.

However, at 235 the administrator may select one or more transactions to roll back, or may choose a bookmark as a point for recovery. For example, if a failure on the source computer 104 requires a recovery of the source database 112 from one or more database backup media, data replication to the target databases 122 is now invalid because the source and target databases do not contain the same data. This is because the database backup media restored the source database 112 to a prior point in time relative to the target database 122.

Resynchronizing and resuming CDC can be performed without restoring backup media to the target database 122. The administrator can interact with the administrative client program, for example, by a menu, a GUI, a command line, or script, to display the bookmarks and transactions that are available for rolling back. The administrative client program is shown installed on a separate administrative client computer 130. However, the administrative client program may be installed on the source computer 104, a target computer 106, or on a separate DRR computer 105 as shown in FIG. 1.

The transaction data, metadata and bookmarks in the DRR repository 114*a*, 114*b* include the information to synchronize the source and target databases following a failure on the source database, or to partially recover the target database. In addition to the bookmarks, the individual transactions within bookmarks are displayed. If a particular bookmark is selected, the DRR agent 116 locates the selected bookmark and its associated transactions in the data replication repository 114*a*, 114*b*. The DRR agent 116 creates the necessary database operations to roll back the transactions recorded in the selected bookmark. Alternatively, the administrator may select individual transactions to roll back.

The DRR agent 116 creates the database operations to roll back (i.e., apply in reverse) the transactions recorded in the selected bookmark, or roll back the individual transactions (if selected). For example, a delete operation is created to undo an insert operation, and an insert operation is created to undo a delete operation. The DRR agent 116 sends the created operations to the target agent 120 to apply to the target database 122. Processing begins from the current log position on the target database 122 and continues backward until the point in time position of the database log on the source database 112 is reached.

At 240, as the transactions are rolled back, the target agent 120 may apply the created database operations on the target databases 122. The target agent 120 may notify the DRR agent 116 as the database operations are executed. Upon receiving notification, the DRR agent 116 may mark the transaction records in the data replication repository 114*a*, 114*b* as "recovered", or may remove them after the database operations are applied and committed on the target databases 122.

It should be noted that the actions of the source agent 110, the DRR agent 116 and the target agent 120 are non-intrusive to the target database 122 while replication recovery is in process. For example, a user can query the target database 122 concurrently with the replication recovery.

Additionally, the agents concurrently apply transactions from the source database to the target databases without suspending application traffic. In an embodiment, this may be accomplished as follows. The CDC replication process includes two phases. During the initial synchronization phase, also referred to as "refresh while active", or simply "refresh", data is synchronized from the source database 112 to the target database 122 while the application executes and generates insert, update, and delete activity on the source database 112. In the initial synchronization phase, the CDC replication records three log positions, or points in time. The first position is the beginning of the earliest open transaction in the source database 112 when the refresh begins. The second is the refresh start position in the log from the source database 112. This is to filter out any transactions that start after the first position, but ended before the refresh start. This position is stored as the start point in the metadata. The third position is the point in time, as recorded in the source database log that the refresh completes. This log position is stored as the end point in the metadata.

When the initial synchronization phase completes, the CDC begins. During CDC, transactions that are open within the start point and end point are indicated as being "in doubt" when they are sent to the target database 122 because they may fail or be cancelled rather than be committed. The target agent 120 applies the received transactions to the target database 122. If the target agent 120 or target database 122 detects an error during CDC, the target agent 120 ignores the error if the transaction is indicated as being "in doubt". This is because the table row was already replicated during the initial synchronization phase (i.e., refresh), and therefore caused either a duplicate or missing transaction, for example. Therefore, the combination of data replication repository 114*a*, 114*b*, the metadata and bookmark, and the DRR agent 116 and target agent 120 cooperate to ensure that transactions are neither duplicated nor omitted.

Figure 3:
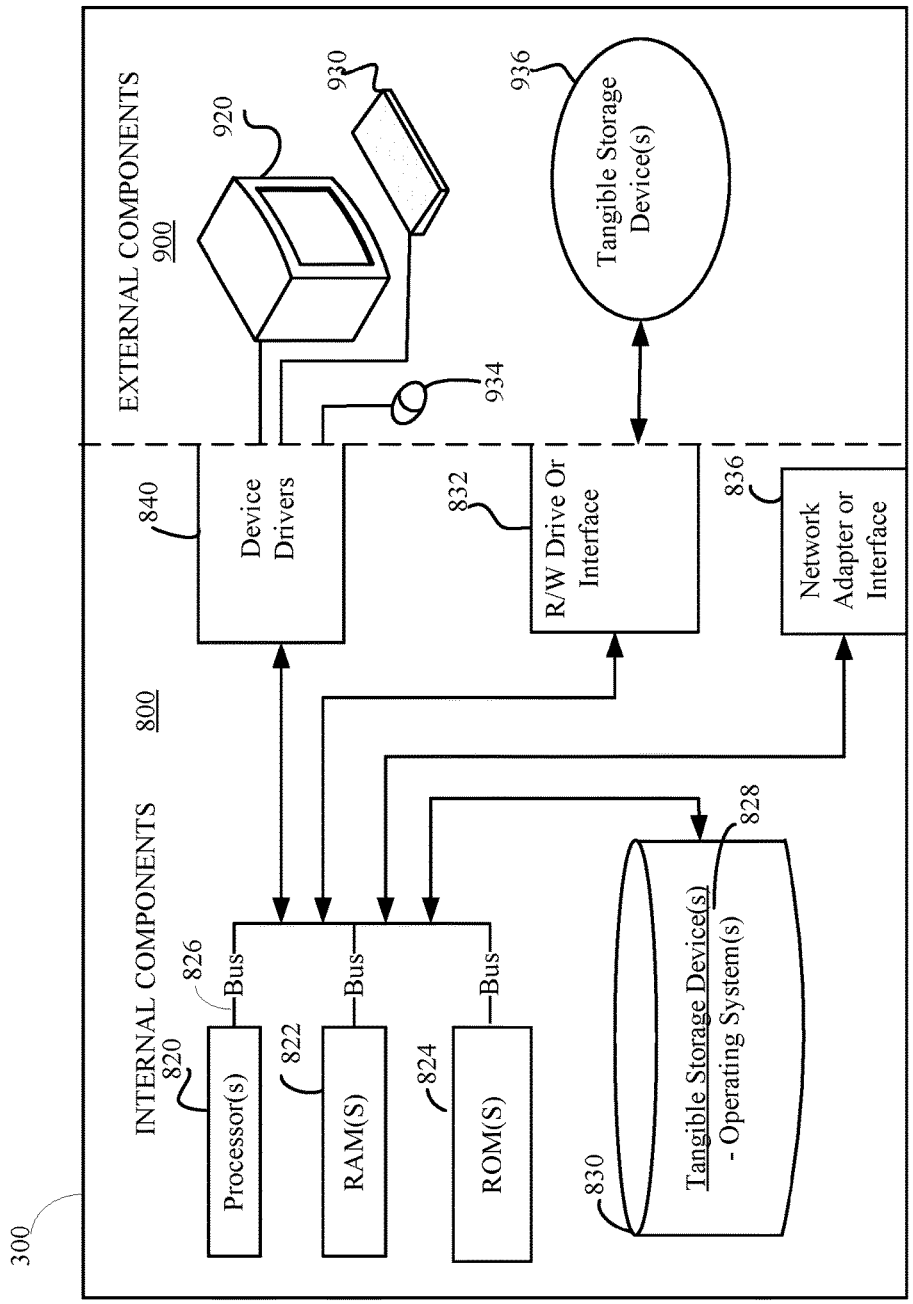
FIG. 3 is a schematic block diagram of hardware and software of the computer environment according to an embodiment of the process of FIG. 2.

FIG. 3 illustrates an exemplary computing device 300 applicable for executing the algorithm of FIG. 2. Computing device 300 may include respective sets of internal components 800 and external components 900 that together may provide an environment for a software application, such as the data replication recoverer. Each of the sets of internal components 800 includes one or more processors 820; one or more computer-readable RAMs 822; one or more computer-readable ROMs 824 on one or more buses 826; one or more operating systems 828; one or more software applications executing the method illustrated in FIG. 2; and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 300, can be downloaded to computing device 300 from an external computer (e.g., server) via a network (for example, the Internet, a local area network, or other wide area network) and respective network adapters or interfaces 836. From the network adapters (or switch port adapters) or interfaces 836 and operating system 828 associated with computing device 300 are loaded into the respective tangible storage device 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A computer system for data replication recovery in a heterogeneous environment comprising:
   one or more processors, one or more computer-readable storage devices, and a plurality of program instructions stored on at least one of the one or more storage devices for execution by at least one of the one or more processors, the plurality of program instructions comprising:
   program instructions to receive, by a data replication recoverer (DRR) agent, one or more committed transaction records from a source agent, wherein the source agent is configured to receive the one or more committed transaction records from a source database;
   program instructions to create, by the DRR agent, data and metadata records from the received one or more committed transaction records, wherein the metadata comprises a transaction identifier, a timestamp associated with a transaction, transaction statistics wherein the transaction statistics include a number of operations performed on the source database, and a number of rows processed on the source database, and program instructions to save the data and the metadata records in a data replication repository; and
   in response to receiving a request to recover a target database, program instructions to selectively recover, by the DRR agent, the target database wherein the target database is recovered using either one or more individual transactions or a bookmark; and
   wherein the program instructions to selectively recover the target database further comprises:
   program instructions to locate the selected bookmark within the data replication repository associated with the target database;
   program instructions to locate an earliest log position entry recorded in the bookmark and a last log position entry recorded in the bookmark in the metadata within the data replication repository associated with the target database;
   program instructions to create a plurality of database operations to reverse the transactions recorded within the earliest log position entry and the last log position entry in the selected bookmark;
   program instructions to send, by the DRR agent, the plurality of created database operations to a target agent on the target database, wherein the target agent executes the plurality of created database operations on the target database;
   based on the created database operations completing on the target database, program instructions to notify the DRR agent, by the target agent; and
   in response to receiving the notification, program instructions for the DRR agent to mark the data and metadata in the data replication repository as being recovered.

2. The computer system of claim 1, wherein the source database differs from at least one of the one or more target databases in architecture, wherein the architecture includes relational and non-relational.

3. The computer system of claim 1, wherein the bookmark records a stable save point in the metadata, and wherein the bookmark comprises a first log position corresponding to a last committed transaction on the target database, a second log position corresponding to an earliest open transaction on the source database, and a third log position corresponding to a last applied transaction on the target database.

4. The computer system of claim 1, wherein each of the one or more target databases is associated with one dedicated data repository.

5. The computer system of claim 1, wherein the data replication repository includes the metadata, the data records created from the received one or more transaction records, and the bookmark.

* * * * *